Nov. 3, 1970     E. A. GFELLER     3,538,274
PNEUMATIC MEASURING SYSTEM INCLUDING A PNEUMOELECTRIC RELAY
Filed Feb. 27, 1967     3 Sheets-Sheet 1

INVENTOR
Ernst Alfred Gfeller
BY
*Imirie & Smiley*
Att'ys.

INVENTOR
Ernst Alfred Gfeller

United States Patent Office 3,538,274
Patented Nov. 3, 1970

1

3,538,274
PNEUMATIC MEASURING SYSTEM INCLUDING
A PNEUMOELECTRIC RELAY
Ernst Alfred Gfeller, Zurich, Switzerland, assignor, by mesne assignments, to Saia AG, Murten, Switzerland, a Swiss corporation
Filed Feb. 27, 1967, Ser. No. 618,784
Claims priority, application Switzerland, Mar. 4, 1966, 3,188/66
Int. Cl. H01h 35/38
U.S. Cl. 200—82                                                    14 Claims

ABSTRACT OF THE DISCLOSURE

A pneumatic measuring system including a pneumoelectric relay having a pressure-controlled member, such as a piston freely displaceable in a symmetrical pneumatic cylinder having fluid inlet passages at each end, and means on said member for control of an electric switch without contacting it.

This invention relates to a pneumatic relay or measuring system comprising a pressure-controlled member and at least one electric circuit element controllable thereby.

Prior relays or measuring systems of this type controllable either by pressure differences when a bridge-type measuring system is used or by overpressure relatively to atmospheric presure, have a pressure-controlled member such as a membrane or piston whereon the pressure or pressure difference and elastical restoring forces act in opposite directions, a switch being mechanically and directly actuated by such members when a predetermined overpressure or pressure difference is attained. These prior devices have a number of disadvantages. In order to properly respond to relatively small presure differences the membranes or pistons should have substantial active surfaces in order to overcome the elastical restoring forces and for reliable operation of a mechanical switch. Voluminous constructions with high inertia and slow operation are the result. When the pressure difference gradually rises the pressure-controlled member is gradually displaced accordingly so that no clear and reliable operation of a switch is possible without the use of snap-action springs. Due to the elastic forces acting onto the piston or membrane, the systems tend to vibrations whereby reliable operation of a switch is rendered even more difficult. The relatively voluminous design of the devices and the considerable forces required for control of switches and overcoming the elastical restoring forces call for high pneumatic control power in spite of the slow operation of the devices.

It is an object of this invention to overcome the above drawbacks by avoiding loading of the pressure-controlled member by elastic restoring forces and actuating forces for a switch. It is a further object to substantially improve the operating speed and sequence of the relay particularly by reducing its dimensions, whereby the control-power requirements may be substantially reduced. The pneumatic relay or measuring system according to this invention is broadly characterized in that the pressure-controlled member, for instance a piston, is freely displaceable in a cylindrical space and is adapted for control of said circuit element without contacting it. In this case the pressure-controlled member, for instance a free piston or a freely displaceable membrane may operate like a

2 snap switch because once the pressure difference acting at the member is sufficient for displacing it in one direction, the displacement will continue until the member has reached its opposite end position, whereby a definite and sudden operation of the relay is obtained. The hysteresis of such a relay is very low because the hysteresis of a mechanically actuated switch has no influence on the pneumatic system.

Figure 1:
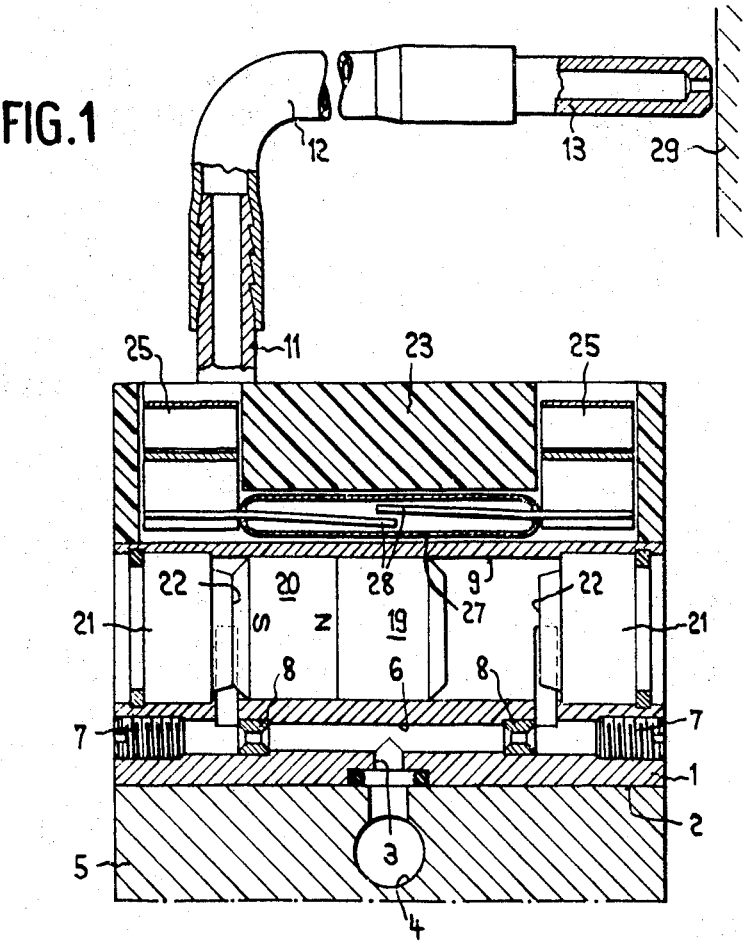
Figure 2:
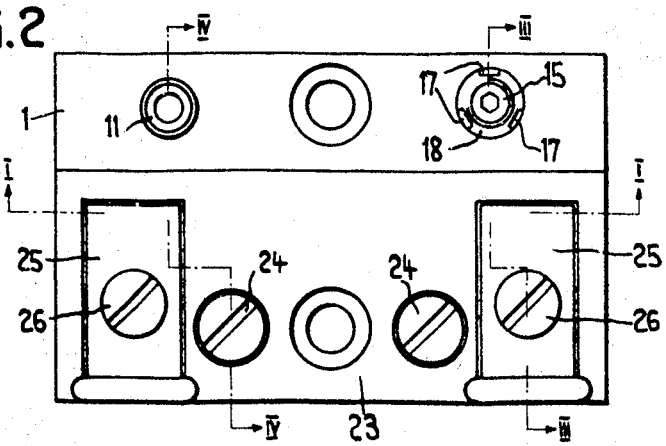
Figure 3:
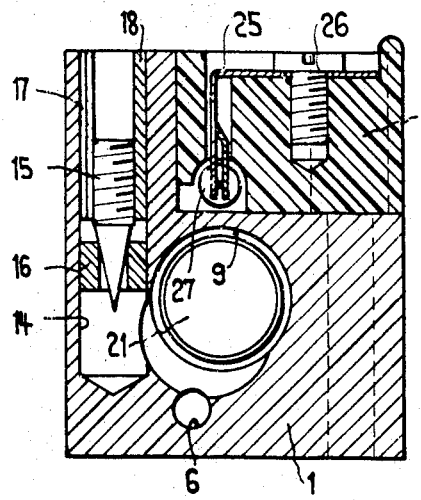
Figure 4:
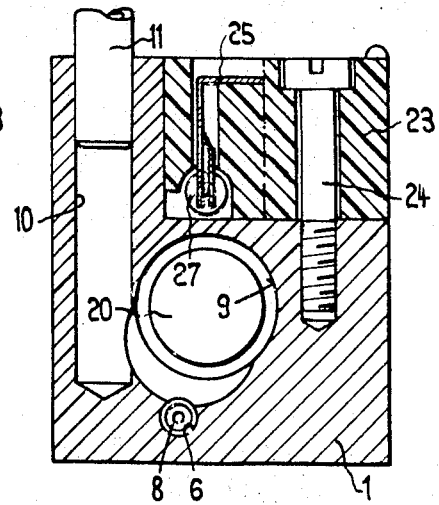
Figure 5:
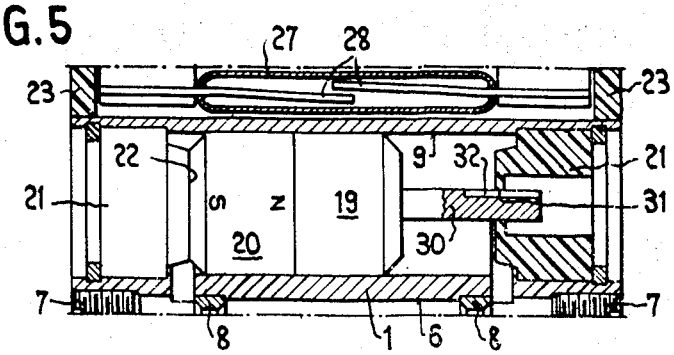
Figure 6:
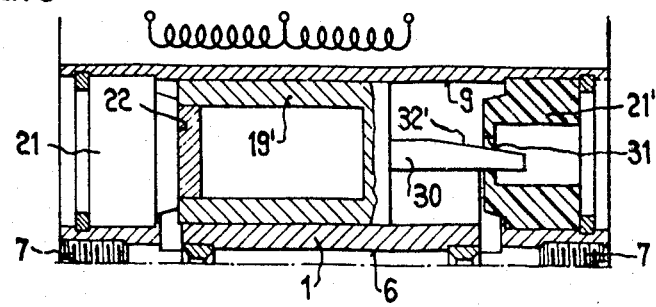
Figure 7:
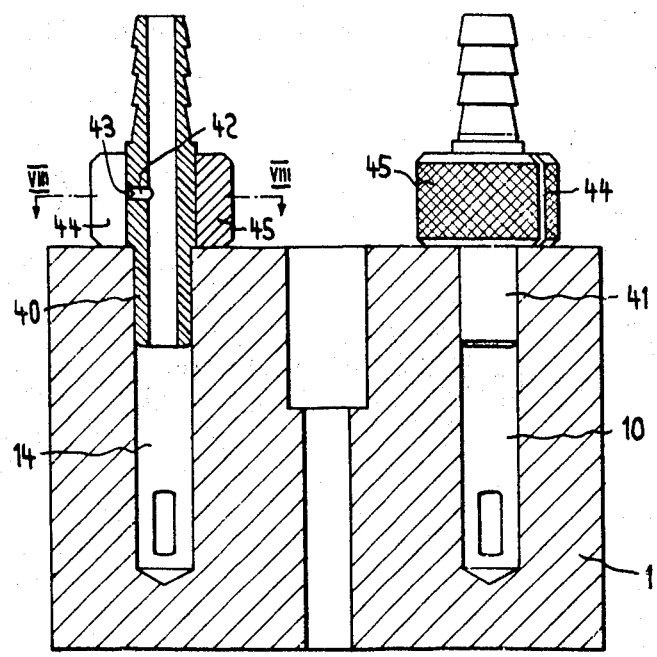
Figure 8:
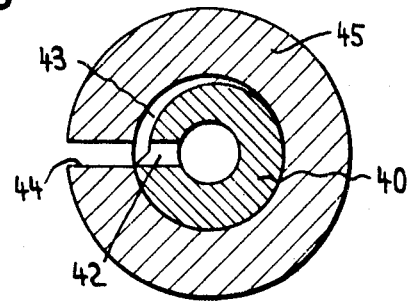

The invention will now be explained by way of example with reference to the accompanying drawings illustrating an embodiment and three modifications of the invention and wherein FIG. 1 is a sectional view of an embodiment of the invention along line I—I in FIG. 2,
FIG. 2 is a top view of the relay of FIG. 1,
FIG. 3 is a section along line III—III in FIG. 2,
FIG. 4 is a section along line IV—IV in FIG. 2,
FIGS. 5 and 6 show each a partial section of a first and second modification,
FIG. 7 is a section of the third modification, and
FIG. 8 is a section along line VIII—VIII in FIG. 7.

The pneumatic relay shown in FIGS. 1-4 has a cylinder block 1 of L-shaped cross section (FIGS. 3 and 4). An inlet opening and canal 3 for pressure air is provided at a plane surface 2 of block 1 which is fixed with this surface 2 contacting a mounting plate 5. Inlet 3 communicates with a bus conduit 4 for pressure air in plate 5. A number of blocks or units 1 may be fixed on plate 5 whereby the inlets 3 of all blocks 1 may communicate with conduit 4.

The inlet 3 opens into a canal 6 closed at each end by means of plugs 7. Baffle pipes or flow resistors 8 are disposed in canal 7 at each side of inlet 3. The end portions of canal 6 outside the baffle tubes 8 communicate with the ends of a cylinder space 9, the one end of the cylinder 9 communicating also with a canal 10 with a connecting pipe 11 for a measuring conduit 12 with a measuring nozzle 13 and the other end of cylinder 9 communicating with a canal 14. A regulating valve accommodated in canal 14 comprises a regulating needle 15 of which the threaded portion engages a threaded tube 18 having grooves 17 at its outside. The needle is axially displaceable relatively to an annular valve seat 16.

A piston consisting of a piston portion 19 of non-magnetizable material and a cylindrical permanent magnet 20 is disposed for free displacement in the cylinder space 9. As indicated in FIG. 1 the permanent magnet 20 is axially magnetized. The cylinder space 9 is closed at each end by means of a plug 21 made of sealing material, for instance soft plastics material. Each of the plugs 21 has a stop surface 22 having a diameter substantially equal to the diameter of the surfaces at the tapered ends of the piston. In order to avoid excessive adhesion of the piston to the end surfaces 22 these surfaces are roughened or uneven. As an example, a number of slightly elevated portions may be provided on such surfaces. The height of such elevated portions should be so small that the gas exchange between the one stop surface 22 and the end surface of the piston contacting it is substantially slowed down.

A base 23 of insulating material is fixed outside the cylinder space 9 on the block 1 by means of screws 24. The cylinder block made of a non-magnetizable material has a relatively thin wall inside the base 23. Two terminal strips 25 are fixed to the base by means of screws 26. The screws 26 also serve for connecting conductors to the terminals. The terminal wires of a switch tube 27 having contacts 28 of ferromagnetic material are taken up between the forks formed at the inner ends of terminal strips 25.

Operation of the relay shown in FIGS. 1 to 4 is as follows:

In the position of the parts shown in the drawing, the piston 19, 20 is in its left end position and the nozzle 13 has an appreciable distance from the surface of an object 29 to be tested. Pressure air admitted through inlet 3 passes through the baffle tubes 8 to both ends of the cylinder and leaves through the valve 15, 16 at one side and through the nozzle 13 at the other side. Since the flow resistance at nozzle 13 is still small, the pressure at the left side of the piston is realtively small. It is assumed that this pressure is smaller than the pressure adjusted at the right side of the piston by means of valve 15, 16. Therefore, the piston is maintained in the illustrated position. When the piston is in is position, the distance of contacts 28 of switch 27 from the permanent magnet 20 is such that the contacts are open. A controlled electric circuit not shown the drawing is thus broken. When the measuring nozzle 13 is now approached to the surface of the object 29, the flow resistance at the nozzle increases and the pressure at the left side of the piston increases until it exceeds the pressure at the right side of the piston by a predetermined value sufficient for displacing the piston to the right. Once the piston is displaced to the right, the total piston surface at the left end thereof which had been covered by the stop surface 22 before, is now freely accessible and the pressure will act on the full piston surface and will rapidly accelerate the same to the right until it abuts against the right stop surface 22. When this other end position is reached, the contacts 28 of switch 27 are now in the most favourable position in the field of magnet 20 and are magnetized with oppositely polarity. They are thus attracted against each other and closed so that the circuit connected to switch 27 will now be closed. When the measuring nozzle is again removed from the object 29 the pressure at the left side of the piston drops and the piston is thrown to the left. Before the piston reaches its left end position as shown in the drawing, the intensity and direction of the magnetic field acting on contacts 28 has changed to such a degree that the contacts are separated by their elastic restoring forces.

The measuring system explained above with reference to FIGS. 1–4 may be used for testing worked surfaces of workpieces, whereby a measuring head with one or more nozzles 13 is approached towards the workpiece to a predetermined distance from a reference point or level of the workpiece. When the surface against which the nozzle is approached is worked to the correct measure, the apparatus may be so adjusted that the relay will not be operated, so that any operation of the relay indicates incorrect working. This may be indicated by means of a lamp and the faulty workpiece may be ejected. Of course the system may operate in the complementary manner, that is, the relay may normally be operated, whereby faulty working is indicated by non-operation of the relay. Moreover, the magnet or the switch may be disposed otherwise, so that the contacts are closed when the piston is in its rest position shown in the drawing, and are open for the other end position of the piston.

The relay operates with extermely small inertia and with accordingly high sequence and also with low hysteresis. With a relay exactly corresponding to the one shown in FIGS. 1–4 having a piston diameter of 10 mm., a piston weight of 3–10 gr. and a piston stroke of .8 mm. more than 10 reversals of the relay per second are possible. The piston is guided in the cylinder in a floating state with ample clearance of 3 to 4/100 of a millimeter. Preferably ring grooves may be provided in the piston in order to reduce gas exchange in axial direction along the piston surface. The operating pressure may range from .5 to 4 kg./cm.$^2$. With the above dimensions of the piston the baffle tubes 8 have a diameter of about .6 mm. and a length of about 1 mm. The total length of the piston preferably exceeds its diameter in order to obtain safe guidance of the piston in the cylinder in spite of the substantial clearance. Change over of the relay may be obtained for a change of the distance of the measuring nozzle from the object 29 by $3/1000$ of a millimeter, that is, the hysteresis of the relay is extremely low.

Of course the field of application of the relay is not limited to test measurements on workpieces, but the relay may also be used for return checking, presence checking and the like in machine tools and the like. The bridge-type arrangement of the pneumatic measuring system is preferable because the effect of fluctuations of the operating pressure is minimized.

FIG. 5 shows an embodiment allowing operating at two different values of the acting pressure difference. In this modification which otherwise corresponds to the embodiment of FIGS. 1–4, the piston 19 has a rod portion 30 extending through a baffle or diaphragm 31 of the one sealing plug 21'. The rod 30 is worked at 32 for reducing its cross section on a predetermined part of its length.

When the piston is in its rest position illustrated in FIG. 5, the rod portion of reduced section engages the diaphragm 31 so that air will escape along the worked portion 32 of the rod, and a relatively low pressure builds up to the right side of the piston. Therefore, a relatively small pressure at the left side of the piston will be able to shift the piston to the right. However, when the left end of the rod portion of reduced section enters into the diaphragm 31 the gas exchange through this diaphragm is stopped or substantially reduced and the pressure suddenly increases at the right side of the piston. The piston now remains in this intermediate position for which the contacts 28 are closed. Only when the pressure at the left side of the piston is further increased to a value sufficient to overcome the increased pressure at the right side of the piston the latter is shifted to its righ end posiion for which the contacts 28 are opened again. Another switch 27 may be disposed in a proper position for being closed when the piston is in its right end position. During the return movement of the piston a similar stepwise operation occurs.

A similar modification of the relay, illustrated in FIG. 6, and differing from that shown in FIG. 5 by a cutting 32' of which the cross section gradually decreases to zero, may be used for analogous measurement and indication. When the pressure increases at the left side of the piston the rod 30 is gradually shifted into the diaphragm 31 whereby the flow resistance through the cutting 32' and the pressure at the right side of the piston increase. Therefore, the position of the piston is an analogous function of the pressure on the left side of the piston. This relay is only of interest when the position of the piston may be indicated analogously, this being possible for instance by means of the differential transformer schematically indicated in FIG. 6. The windings of this transformer may be connected into a measuring bridge. In this relay the piston needs no permanent magnet and it may be hollow for reducing its weight.

As mentioned above, a membrane may be used instead of a piston, the attachment and stroke of the membrane being so designed that practically no variable restoring forces act onto the membrane within its range of operation. Further, a piston made of soft iron or another suitable ferromagnetic material may be used for closing or opening a magnetic path extending perpendicularly to the piston displacement, a circuit element being controlled by the intensity of the magnetic flux. Similarly the piston may control a light beam so that a photocell is illuminated for one position of the piston and dark for the other position of the piston.

The relay may be used in any desired position, that is, it may be used with the cylinder axis horizontal or vertical, the only difference being that a somewhat higher pressure difference is required for shifting the piston upwardly than for shifting it horizontally. This difference may easily be compensated by means of valve 15, 16.

In the modification shown in FIG. 7 and 8, the same cylinder block 1 as shown in FIGS. 1 to 4 is used, but instead of a regulating valve another connection tube is inserted into canal 14. Each of the connection tubes 40 and 41 has a radial bore 42 ending at the deeper end of a groove 43 extending circumferentially. The cross section of groove 42 gradually increases towards the end communicating with the radial bore. Regulating rings 45 with radial slits 44 are rotatably mounted on cylindrical portions of connection tubes 40 and 41.

By adjustment of rings 45 into a predtermined angular position the gas flow from each of the tubes 40 and 41 through its bore 42 and the groove 43 may be regulated. Thereby any desired initial condition may be adjusted when measuring nozzles are connected to each of the tubes 40 and 41. This type of relay is particularly suitable for differential measurement whereby the flow resistances at the nozzles connected to the relay are changed in opposite or push-pull relation by the movement to be measured of a tested obpect. As an example such a differential measuring system may be used for measuring the excentricity of a shaft. The measuring nozzles connected to tubes 40 and 41 are thereby directed against the surface of the rotating shaft at diametrally opposite places of the shaft. If the shaft has no eccentricity, the flow resistance from both nozzles is constant and the relay does not operate. If the shaft has some eccentricity, the distance of the shaft surface from each nozzle periodically changes, the flow resistance at these nozzles being thus periodically changed in opposite sense and the pneumatic relay being periodically reversed. With such a differential measuring system extremely high sensitivity and high operating speeds up to 50 reversals of the relay per second are obtained.

Of course other bases for mounting switches or other circuit elements than those shown in the drawing may be used. When the switch is operated with mains voltage the accessible terminals shown in FIGS. 1–4 are not allowable. In this case, the switch tube 27 or any other element, for instance the windings of the differential transformer shown in FIG. 6, may be embedded in a block of insulating material and connected to conductors extending from the block.

What I claim is:

1. A pneumo-electric relay comprising, in combination, a body defining a cylindrical space having opposite end surfaces, a piston in substantially sealing condition and freely displaceable within said cylindrical space between said end surfaces, fluid admitting means at each end of the cylindrical space for admitting fluid to said cylindrical space at opposite ends of said piston, the piston being thus freely and fully displaceable from one end of the cylindrical space to the other in either direction by any over-upressure acting at any end of the piston and sufficient for displacing the piston, permanent magent means on said piston, and a switch responsive to the field of said magnet meons, the switch being positively controlled by any said full displacement of the piston from end to end of the cylindrical space.

2. A relay according to claim 1, comprising a relay block having a bore therethrough and plugs of sealing material inserted at and completely sealing each end of the bore, thereby defining said cylindrical space in said bore between said plugs.

3. A relay according to claim 2, wherein said plugs of sealing matedial include stop surfaces of a diameter smaller than the diameter of said bore, the effective piston end surface being reduced when contacting one of said stop surfaces of the plug of sealing material.

4. A relay according to claim 1, wherein the said piston forms a displaceable core of a differential transformer.

5. A relay according to claim 1, comprising a switch removably disposed at the outside of a thin wall of a cylinder block.

6. A relay according to claim 1, wherein the said piston has a control portion adapted to continuously regulate an outlet from one cylinder space to the open air for analogous measurement or for discontinuous regulation of an outlet from one cylinder space to the open air for analogeous measurement.

7. A relay according to claim 6, wherein said cylinder portion is a rod of variable cross section extending through a baffle opening of the one end wall of the cylinder.

8. A relay according to claim 1, having two measuring outlets connected to opposite sides of the said pressure-controlled member, a measuring nozzle connected to each of said measuring outlets, and each of said measuring outlets having an adjustable gas outlet disposed parallel to said measuring nozzles.

9. A relay according to claim 8, comprising a connection tube for each gas outlet for connection of a measuring conduit, a cylindrical portion of each connection tube having a radial bore ending in a groove at the outside of the cylindrical portion tapering in circumferential direction, and a split ring being rotatably mounted on the cylindrical portion of each connection tube.

10. A pneumatic measuring system comprising a source of pressure fluid, a pneumatic bridge system including two branches having each a fixed flow passage constituting a fixed flow resistance and a variable flow passage for measuring and compensating purposes respectively connected in series to said source of pressure fluid, a pneumo-electric relay having a cylindrical space, fluid passages from each end of said cylindrical space to the connection between said fixed and variable flow passage of one of the bridge branches, a piston freely displaceable in substantially sealing condition in said cylindrical space, permanent-magnet means on said piston and an electric switch outside said cylindrical space operable by the magnetic field of said magnet means.

11. A pneumo-electric relay comprising a cylinder block having a cylinder bore, plug means inserted into the ends of said cylinder bore, thereby defining a cylindrical space between said plug means, a fluid distributing bore parallel to said cylinder bore, a fluid passage between said fluid distributing bore and each end of said cylindrical space adjacent one of said plugs, a fluid inlet to the center of said fluid distributing bore and a fluid baffle constituting a fluid resistance between said fluid inlet and each of said fluid passages, two fluid outlet ducts communicating each with one of said fluid passages, a regulating valve in one of said fluid outlet ducts and a measuring nozzle connected to the other of said fluid outlets, a piston freely displaceable in said cylindrical space, permanent-magnet means on said piston, a switch unit mounted on said relay block and includling a switch operable by the magnetic field of said magnet means.

12. A relay according to claim 11, wherein said relay block has a substantially L-shaped cross section including a base portion, a side portion extending upwardly at one side of said base portion, said switch unit being mounted on said base portion at the side of the side portion.

13. A relay according to claim 1, comprising a cylinder block having an inlet for a pressure medium connected to said fluid admitting means through flow passages constituting flow resistances, the one fluid admitting means being in connection with the open air through a regulating valve and the other fluid admitting means being in connection with the open air through a measuring nozzle.

14. A relay according to claim 13, wherein the said cylinder block has a plane fixing surface, the said inlet for pressure fluid being disposed at the fixing surface whereas the regulating valve, the connection for the measuring nozzle and the switch terminals are disposed and accessible at the side opposite the fixing surface.

References Cited

UNITED STATES PATENTS

| 2,618,965 | 11/1952 | Gray. | |
| 2,791,657 | 5/1957 | Bloxsom et al. | 200—81 |
| 2,963,563 | 12/1960 | Patterson | 200—81 |
| 3,327,079 | 6/1967 | Widl | 200—82 |

ROBERT K. SCHAEFER, Primary Examiner

H. BURKS, Assistant Examiner

U.S. Cl. X.R.

335—205